United States Patent [19]

McCarty et al.

[11] 4,125,503

[45] Nov. 14, 1978

[54] ULTRAVIOLET CURING EMULSION SYSTEMS

[75] Inventors: William H. McCarty, White House Station; Carlos J. Martinez, Edison, both of N.J.

[73] Assignee: Mobil Oil Corporation, New York, N.Y.

[21] Appl. No.: 731,287

[22] Filed: Oct. 12, 1976

[51] Int. Cl.$^2$ ............................................. C08L 37/00
[52] U.S. Cl. ...................... 260/29.7 NR; 204/159.15; 204/159.16; 204/159.22; 260/29.6 NR; 260/29.6 ME; 260/29.7 UA; 260/29.7 W; 260/29.7 E
[58] Field of Search ................ 260/29.2 EP, 29.6 NR, 260/29.7 NR, 29.7 RP, 29.6 RB, 29.7 UA, 29.7 E; 204/159.15, 159.16, 159.23; 106/20 (U.S. only)

[56] References Cited

U.S. PATENT DOCUMENTS

| | | | |
|---|---|---|---|
| 3,856,744 | 12/1974 | Radlove et al. | 106/20 |
| 3,945,833 | 3/1976 | Sumita et al. | 106/20 |
| 3,945,964 | 3/1976 | Hastings et al. | 260/29.2 EP |
| 3,957,741 | 5/1976 | Rembaum et al. | 204/159.15 |
| 3,989,644 | 11/1976 | Bolon et al. | 204/159.16 |
| 4,003,751 | 1/1977 | Carder | 204/159.23 |
| 4,012,559 | 3/1977 | Fujioka et al. | 204/159.16 |

*Primary Examiner*—Harold D. Anderson
*Attorney, Agent, or Firm*—Charles A. Huggett; Michael G. Gilman

[57] ABSTRACT

Ultraviolet curable aqueous emulsion coating compositions are provided in which the discontinuous phase of the emulsion is constituted by liquid droplets of ultraviolet curable polyethylenically unsaturated material (such as an epoxy polyacrylate dissolved in liquid monoacrylate monomer). These liquid droplets are stabilized in the emulsion by means of a polyoxypropylene-polyoxyethylene emulsifier which serves as a co-sensitizer, especially when the photosensitizer is a phenyl ketone, such as benzophenone.

9 Claims, No Drawings

ULTRAVIOLET CURING EMULSION SYSTEMS

The present invention relates to aqueous emulsion coating compositions which cure upon ultraviolet exposure.

In accordance with this invention, a water insoluble polyethylenically unsaturated material, and especially an epoxy polyacrylate, is emulsified in water using a polyoxypropylenepolyoxyethylene emulsifier. Coatings based on the resulting emulsions exhibit excellent application and film properties, and it has unexpectedly been found that the emulsifier serves as a cosensitizer. Thus, using benzophenone or a derivative thereof as photosensitizer to render the composition sensitive to ultraviolet light, amine cosensitizers (sometimes termed initiators or accelerators) are normally required to provide a rapid cure. These amines introduce undesired color and also color instability to the cured films. In this invention, the compositions cure rapidly without the amine cosensitizer, the cosensitizing function being carried out by the emulsifier.

It is known that polyethylenically unsaturated materials, either along or in combination with monoethylenically unsaturated materials, can be cured by ultraviolet exposure when the system is appropriately photosensitized. Acrylate unsaturation is particularly preferred since it responds best to the ultraviolet energy. Phenyl ketones, such as benzophenone, are particularly suited for rendering these compositions sensitive to the ultraviolet light, but their use has been hampered by the need for amines as has been explained. Aside from the selection of photosensitizer, these systems have also been inadequate because they have been employed in essentially solvent-free compositions in which the preferably resinous polyethylenic material is dissolved in monoethylenic liquid. The application and filming properties of the resulting solutions have not been fully satisfactory.

The use of aqueous emulsions in this invention provides superior application and filming properties.

In this invention a polyethylenically unsaturated material is emulsified in the aqueous continuum, acrylate unsaturation being preferred as previously noted. Thus, pentaerythritol tetraacrylate, which is a viscous liquid, can be used in this invention. However, it is preferred to employ normally solid or extremely viscous polyethylenic materials and to render these sufficiently fluid for emulsification by dissolving the same in a liquid ethylenic material, preferably a liquid monoacrylate.

All sorts of polyethylenically unsaturated resins are available and can be dissolved in liquid monoacrylates for emulsification in this invention. Thus, hydroxy functional polyesters can be esterified with acrylic acid or condensed with N-methylol acrylamide to provide polyethylenic resins useful herein. Similarly, N-methylol acrylamide copolymers can be reacted with hydroxy acrylates, such as 2-hydroxy ethyl acrylate, to provide further polyethylenic resins useful herein. While all of the foregoing are polyacrylates, one can just as easily form the corresponding methacrylate or crotonate. Substituting norbornene alcohol for the hydroxy ethyl acrylate, one can form norbornene ethers useful herein.

The preferred polyethylenic resins are based on epoxy resins. Thus, one can take a diglycidyl ether of a bisphenol and esterify it with acrylic acid or etherify it with hydroxy ethyl acrylate and thereby form epoxy-based polyacrylic resins which are soluble in liquid monoacrylates to form solutions which are particularly adapted for use in this invention.

The polyepoxide is subject to wide variation so long as it has an epoxy functionality of at least 1.2. The preferred polyepoxides are relatively low molecular weight diglycidyl ethers of a bisphenol having an epoxy functionality of 1.4 to 2.0, and these are particularly illustrated by diglycidyl ethers of bisphenol A having a molecular weight in the range of 350–4000, most desirably 350–600. The commercial epoxy resin Epon 828 (Shell) which is a diglycidyl ether of bisphenol A having an epoxide equivalent weight of about 190 and an average molecular weight of about 380 will be used as illustrative. The glycidyl ethers of bisphenols are especially preferred, these being a class of compounds which are constituted by a pair of phenolic groups interlinked through an intervening aliphatic bridge. While any of the bisphenols may be used, the compound 2,2-bis(p-hydroxyphenyl) propane, commonly known as bisphenol A, is more widely available in commerce and is preferred. While polyglycidyl ethers can be used, diglycidyl ethers are preferred.

While the aromatic diepoxides are preferred, the aliphatic polyepoxides and polyepoxides having higher epoxy functionality are also useful, including epoxidized soya oil, epoxy novolaks, 1,4-butanediol diglycidyl ether and the like. These are all well known and available in commerce.

The preferred polyepoxides contain the epoxy group, the secondary hydroxy group, and no other reactive groups.

The polyepoxides can be esterified with acrylic acid, but it is preferred herein to etherify the polyepoxide with an hydroxyacrylate, typically hydroxy ethyl acrylate. In either event, when a diepoxide is used, all the epoxy functionality is consumed in the formation of a diacrylate.

The hydroxy acrylate can first be reacted with a monoanhydride as pointed out in the application of Marvin L. Kaufman, Ser. No. 676,016, filed Apr. 12, 1976, but this is not essential.

The polyethylenically unsaturated resin is then dissolved in an ethylenically unsaturated liquid monomer. The monomers preferably contemplated herein are monofunctional esters of acrylic acid having from 4 to about 20 carbon atoms. The acrylate ester can be an alkyl or hydroxyalkyl acrylate, such as methyl acrylate, ethyl acrylate, hydroxyethyl acrylate, propyl acrylate, isopropyl acrylate, hydroxypropyl acrylate, butyl acrylate, isobutyl acrylate, amyl acrylate, hexyl acrylate, octyl acrylate, 2-ethylhexyl acrylate, decyl acrylate, dodecyl acrylate, tetradecyl acrylate, and hexadecyl acrylate. Also contemplated are the acrylic esters of the well known class of ether alcohols having the formula: $ROCH_2CH_2OH$, wherein R is $C_1$–$C_6$ alkyl or phenyl, i.e. the Cellosolves. Examples of such esters are methoxyethyl acrylate (Methylcellosolve acrylate), ethoxyethyl acrylate (Cellosolve acrylate), butoxyethyl acrylate (Butylcellosolve acrylate), isobutoxyethyl acrylate (Isobutylcellosolve acrylate), hexoxyethyl acrylate (Hexylcellosolve acrylate), and phenoxyethyl acrylate (Phenylcellosolve acrylate). The contemplated reactive monomer vehicle can be designated by the formula: $CH_2=CHCOOR$, wherein R is $C_1$–$C_{15}$ alkyl or hydroalkyl; $C_2H_4OR'$, wherein R' is $C_1$–$C_6$ alkyl or phenyl;

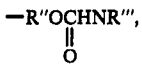

wherein R" and R'" are $C_1$–$C_4$ alkyl, phenyl, or cresyl;

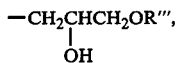

wherein R'" is previously defined; and —R""O

wherein R"" is $C_1$–$C_4$ alkyl, R""" is H or $C_1$–$C_3$ alkyl, and $x$ is an integer from 1 to 10.

In the case above when R is

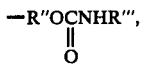

the reactive monomer is a carbamoyloxyalkyl acrylate. Compounds of this class are readily prepared by well known methods for preparing carbamates. Thus, a hydroxyalkyl acrylate, e.g., hydroxyethyl acrylate, can be reacted with an isocyanate, e.g., butyl isocyanate, phenyl isocyanate, or cresyl isocyanate to form the carbamoyloxyalkyl acrylate, in the presence of a catalyst, e.g., dibutyltin dilaurate. Alternatively, the carbamoyloxyalkyl acrylate can be prepared by first reacting a hydroxyalkyl acrylate, e.g., hydroxyethyl acrylate, with phosgene in the presence of a base to give chloroformate intermediate and then further reacting this intermediate with an amine, e.g., ethylamine, butylamine, or aniline, in the presence of a tertiaryamine acceptor for HCl, e.g., triethylamine.

When R is

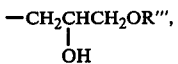

the reactive monomer is an alkyl 2-hydroxypropyl ether acrylate. Compounds of this class are readily prepared by the well known addition esterification reaction of acrylic acid with an alkyl glycidyl ether, e.g. butyl glycidyl ether.

When R is

the reactive monomer will be a polyoxyethylene ether of alkyl acrylate. Generally, these compounds can be prepared by reacting a hydroxyalkyl acrylate with an alkylene oxide (1,2-epoxyalkane), e.g. ethylene oxide, 1,2-epoxypropane, or 1,2-epoxybutane, using a molar ratio of acrylate:alkylene oxide of 1:1 to about 10:1, at about 30°–75° C., and using an initiator such as borontrifluoride etherate. In the specific case wherein the alkylene and the alkyl groups are all ethyl, the acrylate can be prepared by monoesterification of a poly (oxyethylene) glycol (commercially available under the registered trademark Carbowax) with acrylic acid or acryloyl chloride.

Typical examples of carbamoyloxyalkyl acrylates, alkyl or aryl, 2-hydroxypropyl ether acrylates (alkoxy-2-hydroxypropyl acrylates), and hydroxy polyoxyalkylene ethers of alkyl acrylates include butylcarbamoylethyl acrylate, phenylcarbamoylbutyl acrylate, cresylcarbamoylpropyl acrylate, butoxy-2-hydroxypropyl acrylate, phenoxy-2-hydroxypropyl acrylate, cresoxy-2-hydroxypropyl acrylate, hydroxy penta (oxypropyl) ether of ethyl acrylate, hydroxy deca(oxyethylene) ether of butyl acrylate, and hydroxy hexa (oxybutylene) ether of propyl acrylate.

The reactive liquid monomer can be constituted by or include a minor amount of a polyfunctional acrylate, e.g. neopentylglycol diacrylate, trimethylol propane triacrylate, pentaerythritol triacrylate, and the like, but the liquid monomer is preferably monofunctional since these have the greatest fluidity. In some formulations, the liquid reactive monomer may have such a high viscosity that it renders the solution of polyethylenic material in monoethylenic liquid too viscous for direct application to a substrate, but such application is enabled herein by the aqueous emulsion form of the composition. In some cases, it will be desirable to facilitate emulsification by using or adding a non-acrylic monomer to the reactive monomer vehicle, these non-acrylic monomers being illustrated by N-vinyl pyrrolidone.

The combination of the polyethylenically unsaturated resin and liquid monomer is obtained by simply stirring the two together. Mild heat may be used to assist dissolution. The proportion of liquid monomer is determined by the viscosity which is desired, so the ratio of polyethylenic resin and liquid monomer may broadly vary from 5:95 to 95:5, but is preferably in the range of 25:75 to 75:25.

It should be noted that more viscous liquids can be emulsified than can be directly applied by conventional coating equipment.

It will also be noted that the liquid monomer is present as the discontinuous phase of the aqueous emulsion, and this minimizes problems of volatility and toxicity.

Polyoxypropylene — polyoxyethylene emulsifiers are themselves well known. Polypropylene glycol having a molecular weight of at least about 850 is hydrophobic, and when ethylene oxide is reacted therewith, a hydrophilic chain is formed on each of the terminal hydroxy groups of the starting polypropylene glycol. The result is a nonionic emulsifying agent which is useful herein, the polyoxypropylene portion of the molecule apparently providing the cosensitizer effect desired herein. For this purpose the molecular weight of the poly(oxypropylene) hydrophobe is preferably at least about 2000, most preferably at least about 3500. The ethylene oxide content can broadly vary from about 5% to 90%, but an ethylene oxide content of from 50–85% is preferred, especially from 60–75%.

Emulsifying agents of the above type are available in commerce from BASF Wyandotte Corporation in Wyandotte, Mich., under the trade designation "Pluronic". The product known as "Pluronic F 127" is preferred, this material having a poly(oxypropylene) hydrophobe with a molecular weight of about 4000 adducted with about 70% of ethylene oxide.

The proportion of the emulsifying agent is selected to provide a stable emulsion. This broadly ranges from about 0.1% to about 15%, but the more usual proportions are from 2-10%, based on the weight of resin which it is intended to emulsify.

The resin solids content of the emulsions is of secondary significance, but is generally in the range of from 30-60% by weight.

The coating compositions of this invention are intended to be cured by exposure to radiation. Ionizing radiation, such as electron beam radiation, may be used, but it is particularly preferred to employ ultraviolet radiation for the cure because of its convenience, and also because it can be carried out in the presence of air. The coatings of this invention may be applied clear or pigmented, but as is well known, certain pigments or heavy pigmentation can render the ultraviolet cure difficult, in which case it is preferred to employ ionizing radiation.

When the radiation used is electron beam radiation a photosensitizer is not needed, but when ultraviolet light is used, a photosensitizer is needed. Suitable sensitizers include acetophenone, 4'-t-butyl-2,2,2-trichloroacetophenone, 4'phenoxy-2,2-dichloroacetophenone, benzophenone, xanthone, benzoin isobutyl ether, benzoin isopropyl ether, and 2-chlorothioxanthone. Phenyl ketones are preferred, especially benzophenone. The photosensitizer is preferably dissolved in the liquid mixture which is emulsified.

The invention will be illustrated in the examples which follow. In these examples, and throughout this specification and claims, all parts are by weight unless otherwise specified.

EXAMPLE 1

50 parts of an epoxy diacrylate made by reacting hydroxy ethyl acrylate with a diglycidyl ether of bisphenol A having a molecular weight of about 390 is dissolved in 50 parts of butyl carbamoyl ethyl acrylate, and the solution is mixed with 5 parts of benzophenone photosensitizer and 10 parts of Pluronic F 127 emulsifier. This mixture is subjected to high speed agitation and 100 parts of deionized water is added slowly to produce an emulsion having an average particle size of less than about 1 micron.

This emulsion is drawn down on a metal panel and allowed to air dry until a coalesced film is formed (which takes about 1 minute) and this film is then cured by passing the same under two focused 200 watt per inch medium pressure mercury lamps, two curing speeds being used. The cure is carried out in an air atmosphere and the ultraviolet cured films are then post baked at 350° F., for 5 minutes. The resulting films are dry and nontacky, and the effectiveness of the ultraviolet cure is noted by measuring the weight loss which takes place upon baking. In this case, ultraviolet cure at 25 feet per minute gave a 95% weight retention. Faster ultraviolet cure at 50 feet per minute gave a 91% weight retention.

Repeating the above example, but omitting the water and the Pluronic emulsifying agent gives a reduced curing response to the ultraviolet radiation. At 25 feet per minute, the weight retention is only 91%, and at 50 feet per minute the weight retention is 87%.

The invention is defined in the claims which follow.

We claim:

1. An ultraviolet curable aqueous emulsion coating composition consisting essentially of water having emulsified therein liquid droplets comprising ultraviolet curable water insoluble extremely viscous to solid polyethylenically unsaturated resin in solution in ethylenically unsaturated liquid monomer, the ratio of polyethylenically unsaturated resin to liquid monomer being in the range of 5:95 to 95:5, said liquid droplets containing a phenyl ketone photosensitizer and being stabilized in the emulsion by means of a polyoxypropylene-polyoxyethylene emulsifier in an amount of about 0.1% to about 15%, based on the weight of resin which it is desired to emulsify.

2. An emulsion as recited in claim 1 in which said polyethylenically unsaturated resin is a resin having a plurality of acrylate ester groups and said liquid monomer is a monofunctional ester of acrylic acid having from 4 to 20 carbon atoms.

3. An emulsion as recited in claim 2 in which said resin is an epoxy resin having a plurality of acrylate ester groups.

4. An emulsion as recited in claim 3 in which said epoxy resin is a diacrylate of a diglycidyl ether of a bisphenol.

5. An emulsion as recited in claim 1 in which said photosensitizer is benzophenone.

6. An emulsion as recited in claim 4 in which said diglycidyl ether of a bisphenol has a molecular weight in the range of 350-600.

7. An emulsion as recited in claim 4 in which said diacrylate is a diether of an hydroxy acrylate with said diglycidyl ether.

8. An emulsion as recited in claim 1 in which said emulsifier contains a poly(oxypropylene) hydrophobe and an ethylene oxide content of from 50-85%.

9. An ultraviolet curable aqueous emulsion coating composition comprising water having emulsified therein liquid droplets consisting essentially of epoxy resin having a plurality of acrylate ester groups and a phenyl ketone photosensitizer dissolved in a liquid monoacrylate, said liquid droplets being stabilized in the emulsion by means of a polyoxypropylene-polyoxyethylene emulsifier in an amount of from 2-10%, based on the weight of resin which it is desired to emulsify, said monoacrylate being a monofunctional ester of acrylic acid having from 5 to 20 carbon atoms.

* * * * *